United States Patent
Standley (10) Patent No.: US 8,720,803 B1
(45) Date of Patent: May 13, 2014

(54) MULTIPLE-LINE IRRIGATION SYSTEM AND METHOD

(71) Applicant: John S. Standley, Garden City, KS (US)

(72) Inventor: John S. Standley, Garden City, KS (US)

( * ) Notice: Subject to any disclaimer, the term of this patent is extended or adjusted under 35 U.S.C. 154(b) by 0 days.

(21) Appl. No.: 13/908,672

(22) Filed: Jun. 3, 2013

(51) Int. Cl.
*B05B 7/12* (2006.01)
*B05B 7/04* (2006.01)
*B05B 3/18* (2006.01)

(52) U.S. Cl.
USPC ............ 239/728; 239/722; 239/407; 239/434

(58) Field of Classification Search
USPC ................. 239/398, 407, 408, 409, 433, 434, 239/722–754
See application file for complete search history.

(56) References Cited

U.S. PATENT DOCUMENTS

| | | | |
|---|---|---|---|
| 3,648,930 A * | 3/1972 | Brown et al. | 239/727 |
| 4,397,421 A * | 8/1983 | Schram | 239/727 |
| 4,729,514 A * | 3/1988 | Ostrom et al. | 239/727 |
| 6,126,088 A | 10/2000 | Wilger et al. | |
| 6,666,384 B2 * | 12/2003 | Prandi | 239/1 |
| 6,938,842 B2 | 9/2005 | Choat et al. | |
| 8,170,849 B2 | 5/2012 | Schick et al. | |
| 2002/0005443 A1 | 1/2002 | Drechsel | |
| 2008/0046130 A1 | 2/2008 | Faivre et al. | |
| 2012/0253530 A1 | 10/2012 | Malsam | |
| 2012/0267447 A1 | 10/2012 | Abts | |

* cited by examiner

*Primary Examiner* — Justin Jonaitis
(74) *Attorney, Agent, or Firm* — Thomas W. Galvani, P.C.; Thomas W. Galvani (57) ABSTRACT

A multiple-line irrigation system includes a plurality of spans extending from a central pivot, a first pipeline for carrying water, and a second pipeline for carrying chemicals. Each span includes a distribution assembly which draws water and chemicals from the first and second pipelines independently of distribution assemblies in the other spans so as to distribute the water and chemicals as a mixture onto a field according to the requirements of the field under each span. Auxiliary lines coupled to the pipelines in the distribution assembly in each span include valves to regulate the supply of water and chemicals from the pipelines.

14 Claims, 6 Drawing Sheets

MULTIPLE-LINE IRRIGATION SYSTEM AND METHOD

FIELD OF THE INVENTION

The present invention relates generally to agricultural equipment, and more particularly to large-scale agricultural irrigation systems.

BACKGROUND OF THE INVENTION

Farmers in America have continually battled water shortage issues. The Ogallala aquifer is a rapidly-dwindling source of water that is being consumed faster than it can be replenished. Cycles in rainfall and weather are unpredictable, and farmers often resort to rationing water among their crops and livestock. Of course, putting less water on crops limits their ability to grow and produce, and in turn limits the profit for the farmer. However, many farmers find themselves in such predicaments because they simply do not have enough water to spread effectively.

Irrigation techniques have been developed to improve the efficiency with which water is stored, distributed, and used. Many farmers use center-pivot irrigation to irrigate their fields. Center-pivot irrigation systems typically have a main water pipeline extending from a central pivot to a distal end across several structural spans supported on moveable towers. Most center-pivot irrigation systems are one-quarter mile systems, such that they have lengths of about 1300 feet and irrigate a field of approximately 122 acres. A plurality of nozzles depend from the water pipeline along each span, often by hoses, drop pipes, or "goosenecks," so that the nozzles are positioned just above the field of crops. The nozzles are typically spaced between thirty and ninety-six inches apart. The most common spacing between nozzles is sixty inches, such that a standard 1300-foot system includes approximately 260 nozzles.

When water is pumped and applied through the water pipeline and the towers drive around the central pivot, the field is watered in a circular fashion, producing a circular field. Center-pivot irrigation systems are very effective systems for applying water across a circular field, especially when the soil is consistent across the field, the sun exposure is consistent, the terrain is flat, and the same crop is planted across the field. In such situations, a farmer can easily determine the amount of water that must be supplied to the center-pivot irrigation system and also the rate at which the center-pivot irrigation system must rotate to provide the crops in the field with the necessary water.

Generally, however, in a field that is half a mile on one side, it is unlikely that a farmer's field is consistent in elevation, soil quality, sun, and crop type. Portions of the field may have fertile soil, and other portions may have poor soil. Some areas of the field may be higher, and others may be lower, to the extent that rain gathers in the low areas and forms water holes or ponds, or such that watering low areas would lead to standing water. Transitions between high and low elevations can change the duration and angle of sun exposure on a portion of the field. Farmers may plant different crops in sectors, which have pie-wedge shapes, or in arcs, perhaps because of the quantity of seed and desired yield, or perhaps because the soil in that portion of the field is more suitable for one type of crop over another. For these reasons and others, different parts of a circular field typically require different amounts of water. Further, different parts of a circular field often should be watered at different intervals. The farmer must thus plan carefully how crops are planted so as to be able to best water them; he may decide to plant crops in sectors and manually interrupt every rotation of the irrigation system to turn the water supply on or off depending on the needs of the sector, or he may actually choose to over-water some portions of the field or under-water other portions of a field. For example, a farmer can run a center-pivot irrigation system at the rate required by a crop in a first section of the field, putting a corresponding amount of water on the field. However, that rate of rotation and amount of water may be too great for a second section of the field, so that by watering to the demands of the first section, the farmer may be sacrificing the full potential of the crop in the second section. Not only does such a practice reduce the yield of the crop in the second section of the field, but it also distributes water unnecessarily and consumes more electricity than would be required with watering the entire field with one revolution of the irrigation system.

While some modern center-pivot irrigation systems apply only water, others apply a combination of water and chemicals, such as fertilizers or pesticides. In some systems, the chemicals are fed into the water pipeline at the center pivot from a tank containing the chemicals. The chemicals are then carried with the flow of water through the water pipeline to each span and expelled out the nozzles onto the field. Because the chemicals are introduced at the central pivot, the chemicals and water are mixed together and carried through the water pipeline, and the dispersal of chemicals across the field is regulated as described above, by regulating the pressure of the water and the speed of rotation of the center pivot irrigation system about the central pivot. Carrying chemicals in the same line as the water risks contamination of the water line, and the chemicals often corrode the water line over time, which can cause leakage of chemical and damage to the sprinkler requiring maintenance. An improved method for efficiently and effectively applying water and chemicals to a field is needed.

SUMMARY OF THE INVENTION

According to the principle of the invention, a multiple-line irrigation system for irrigating a field includes a first pipeline supported across a plurality of spans by moveable towers for supplying water along the system, and a second pipeline coextensive to the first pipeline and for supplying liquid chemicals along the system. The system is one that is either built anew or modified from a pre-existing irrigation system. The first and second pipelines are separated from fluid communication with each other. Each span of the irrigation system includes a manifold coupled in fluid communication within the span to the first and second pipelines to receive and distribute the water ad chem chemicals onto the field independently of the distribution of the water and chemicals in other spans. First and second auxiliary lines in each span coupled the first and second pipelines to the manifolds in each span. A valve and a flow meter in the first auxiliary line control the flow of water through the first auxiliary line, and valves in the second auxiliary line control the flow of chemicals through the second auxiliary line, so that the irrigation system applies water and chemicals to a sector of the field under the span in response to the water and chemical requirements of that sector of the field.

BRIEF DESCRIPTION OF THE DRAWINGS

Referring to the drawings.

DETAILED DESCRIPTION

Figure 1:
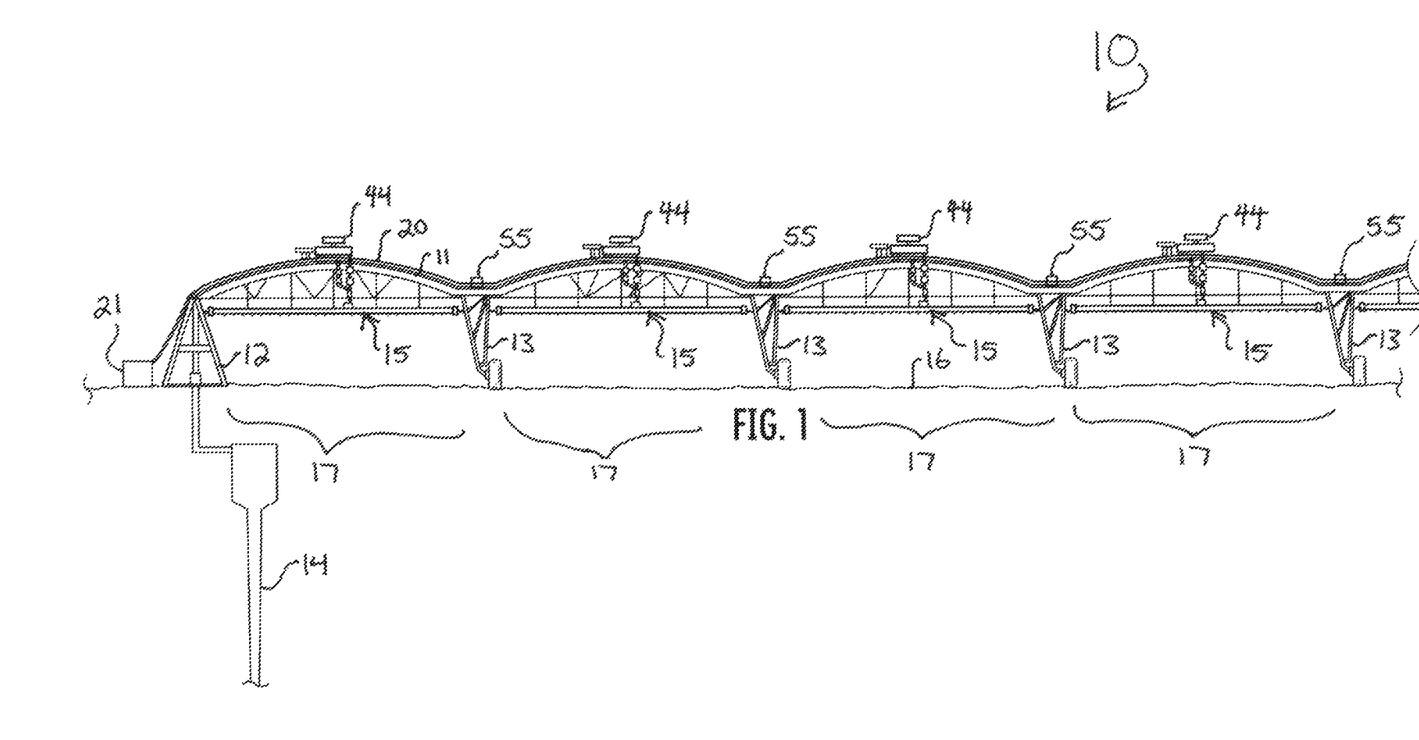
FIG. 1 is a front elevation view of a multiple-line irrigation system constructed and arranged in accordance with the principle of the invention, illustrating a plurality of spans extending between towers from a central pivot and including a water line and a chemical line.

Reference now is made to the drawings, in which the same reference characters are used throughout the different figures to designate the same elements. FIG. 1 illustrates a multiple-line irrigation system, or "sprinkler" 10, constructed and arranged in accordance with the principle of the invention. The sprinkler 10 includes a main water line 11 extending radially from a central pivot 12 and includes a series of spans 17, four of which are shown entirely in FIG. 1. It will be understood that each of the spans 17 are identical, and so discussion herein will be to one of the spans 17 only, unless otherwise explicitly stated. The sprinkler 10 in the preferred embodiment includes seven spans 17, with each span 17 having a length of approximately 180 feet, so that the sprinkler 10 is approximately 1300 feet in length. The span 17 proximate to the central pivot 12, which is referred to as the first span, extends from the central pivot 12 to a moveable tower 13, and the water line 11 is supported by the central pivot 12 and the tower 13. Across each other span 17, the water line 11 is supported at an elevated position above the ground 16 by and between the towers 13.

The water line 11 is coupled in fluid communication to a fluid source 14, preferably a water well, to draw water from the water source 14 up through the central pivot 12, into the water line 11, and out a distribution assembly 15 onto the ground 16. The sprinkler 10 also includes a chemical line 20 extending radially from the central pivot 12 and supported proximate to the main water line 11 by the towers 13. The chemical line 20 is a pipeline coupled in fluid communication to a secondary source 21 preferably containing a chemical or mixture of chemicals in a fluid state, so that chemicals may be drawn into and communicated through the chemical line 20 and then expelled out the distribution assembly 15 onto the ground 16.

With water communicated through the water line 11, and chemicals communicated through the chemical line 20, the water and chemicals are maintained separately from each other along sprinkler 10 until mixing in the distribution assembly 15 at each span 17. The flow and pressure of water in the water line 11 is regulated, and the flow and pressure of chemicals in the chemical line 20 is regulated, so that the water and chemicals are independently controllable and can be applied to the ground 16 in different amounts across the length of the sprinkler 10. The distribution assembly 15 at each span 17 allows application of water and chemicals to be controlled independently of other spans 17. In this way, and referring to FIG. 2 which illustrates a field 22, the sprinkler 10 can apply water and chemicals in varying amounts across arcs and sectors of the field 22 to increase or decrease the amount of water and chemicals those arcs and sectors receive, such as may be desired based on the topology, soil conditions, or other factors associated with an area of the field 22. For instance, area 23, identified with broken line, may be a pond in the field which does not need to receive water or chemicals, while area 24, which is a sector between area 23 and the central pivot 12, may be planted with a crop that has high water and chemical demands, and area 25, which is a sector between area 23 and an edge 26 of the field 22, may be planted with a crop that has medium water demands but high chemical demands. The system applies water and chemicals to each independently without manual interruption by the farmer.

Figure 3:
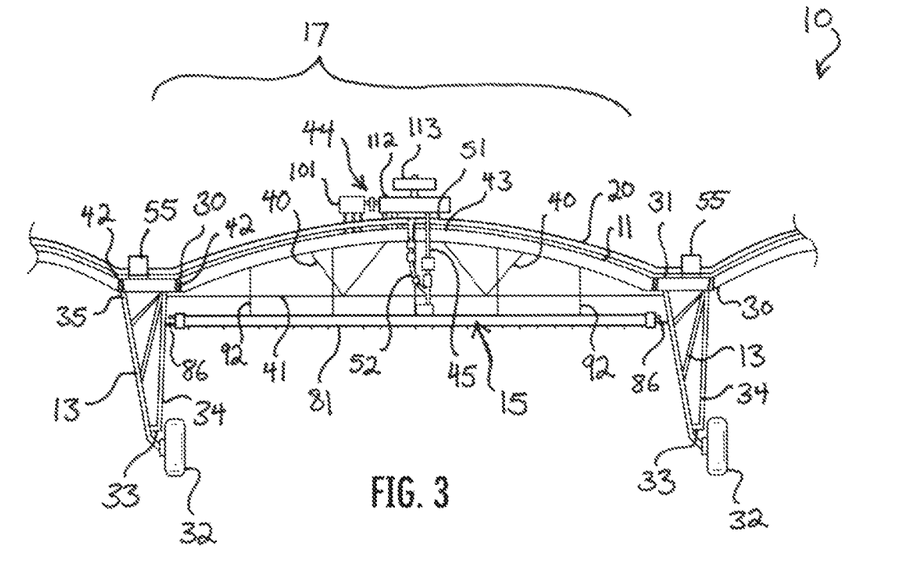
FIG. 3 is an enlarged front elevation view of the multiple-line irrigation system of FIG. 1, showing a distribution assembly in a single span between two towers.

Referring now to FIG. 3, a single span 17 of the sprinkler 10 is shown. The span 17 is flanked on opposed upstream and downstream ends 30 and 31 by towers 13 supporting the water line 11 and chemical line 20. As used here, the terms "upstream" and "downstream" refer to the direction of the normal operational movement of fluids through the water line 11 and chemical line 20, with fluids moving from the upstream end 30 to the downstream end 31 in a single span 17. Because the spans 17 are arranged in series outwardly from the central pivot 12, the downstream end 31 of one span 17 is proximate to the upstream end 30 of another span 17. The tower 13 is a rolling A-frame framework; two spaced-apart, in-line wheels 32 driven by a motor are mounted for rotation to a bottom 33 of the tower 13, and frame members 34 extend upward from proximate to the wheels 32 to meet at a top 35 of the tower 13. At the top 35 of the tower 13, the frame members 34 are secured to the water line 11, as by bolts, welding, or similar strong fastening. The towers 13 are constructed from a material or combination of materials having material characteristics of strength, rigidity, and durability.

The water line 11 is a hollow pipe, or assembly of pipes bolted together, between approximately six and eight inches in diameter which defines a rigid, structural piece extending between the towers 13. In embodiments in which the water line 11 is an assembly of pipes bolted together, the pipes are typically each twenty to thirty feet in length. Spaced-apart truss elements 35 extend outward and downward from the water line 11 and are coupled together at distal ends with opposed guy wires or shrouds 41 extending horizontally from the tops 35 of the towers 13. The shrouds 41 are rigged taut between the towers 13 and, together with the truss elements 40, provide lateral stability to the water line 11 between the towers 13, so that the spans 17 of the sprinkler 10 remain rigid during rotation of the sprinkler 17 about the field 22. The water line 11 includes a joint 42 at the top 30 of each tower 13 which allows the spans 17 to flex with respect to each other and prevents damage to the water line 11 when the spans 17 flex, as is well known in the art, and as such, will not be described here further.

The water line 11 arches to a top 43 between each tower 13 and is level along the top 35 of each tower 13, so that air which may be present in the water line 11 will settle to the top of the water line 11. A filter and air separator assembly 44 is mounted to the top 43 of the water line 11 and coupled in fluid communication to the water line 11. Water moving through the water line 11 moves into the filter and air separator assembly 44, where the water is removed of any air and is then communicated down an auxiliary line 45 in the distribution assembly 15.

The chemical line 20 is a hollow conduit extending between the towers 14. As seen briefly in FIG. 4, the chemical line 20, disposed above the water line 11, follows the arc of the water line 11, and is supported by struts 50 extending upward from the water line 11 at spaced-apart intervals along the water line 11. In embodiments in which the chemical line 20 is a rigid pipe, the chemical line 20 includes a joint at the top 30 of each tower 13 which allows the spans 17 to flex with respect to each other and prevents damage to the chemical line 20 when the spans 17 flex.

Figure 4:
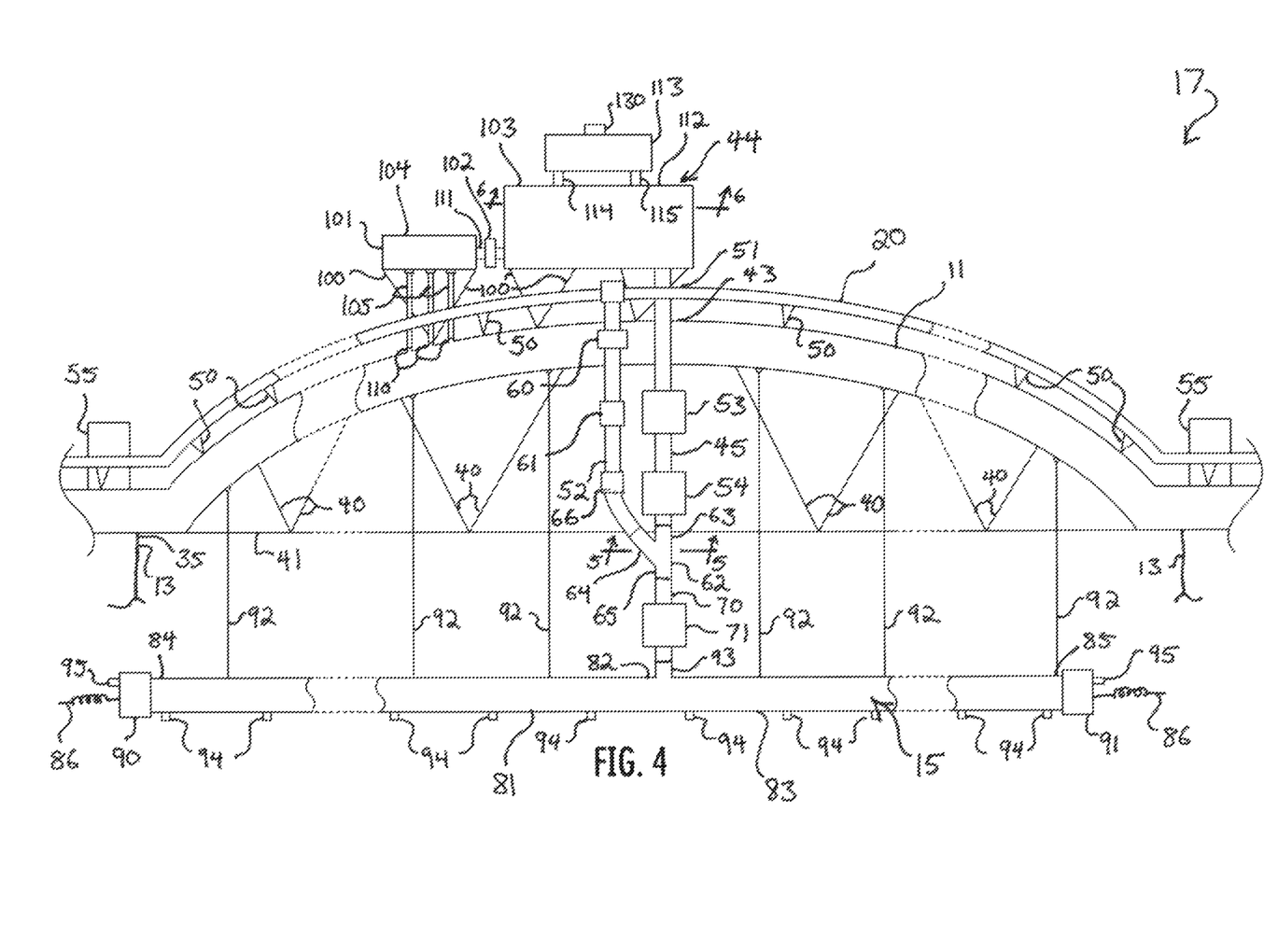
FIG. 4 is a view similar to FIG. 3, showing the span in enlarged detail and showing an filter and air separator assembly mounted atop the span.

The chemical line 20 arches to a top 51 between each tower 13 and is level along the top 35 of each tower 13, so that any air that may be present in the chemical line 20 will settle at the top 51 of the chemical line 20. A high-pressure, low-volume auxiliary line 52 is coupled in fluid communication to the chemical line 20 to communicate chemicals through the chemical line 20 in the distribution assembly 15. The chemical line 20 carries chemicals at pressures of 125 pounds per square inch and higher, and as such, may be either a rigid pipe or a flexible hose constructed from a material or combination of materials having material characteristics of strength, durability, and chemical inertness, such as plastic, stainless steel, aluminum, or polyvinyl chloride, or the like.

Referring now to FIG. 4, the auxiliary line 45 extending from the filter and air separator assembly 44 is a conduit formed with a valve 53 and a flow meter 54 to control and measure the flow of the water through the auxiliary line 45 from the water line 11 and in the distribution assembly 15. The auxiliary line 45 is approximately two inches in diameter, but may be more in the outermost spans 17 to accommodate higher volumes of water. The auxiliary line 52 carrying chemicals is smaller than the auxiliary line 45 carrying water, such as three-quarters on an inch. The auxiliary lines 45 and 52 each may be a rigid pipe or a flexible hose which has material characteristics of durability and inertness, constructed from a material such as plastic, stainless steel, aluminum, or polyvinyl chloride, or the like.

The valve 53 in the auxiliary line 45 is preferably a butterfly valve, but one having ordinary skill in the art will readily appreciate that any valve may be used which is capable of adjustably regulating flow through the auxiliary line 45, such as a ball valve or the like. The valve 53 is formed downstream from the filter and air separator assembly 44. The valve 53 is coupled in wired or wireless data communication to a computer 55 at the top 35 of the upstream tower 13, and the computer 55, in turn, is coupled in wired or wireless data communication to a central computer operable by the farmer, such as a remote computer in the home or office of the farmer. It should be noted that the term "farmer" is used herein for simplicity to describe any operator of the sprinkler 10 and not to limit the definition of the operator of the sprinkler 10. The computer 55 also includes a mechanical sensor for measuring the relative angle between two neighboring spans 17, including a paddle offset at a selected angle and connected to a micro-switch so that a circuit is completed when two neighboring spans 17 move to the selected angle with respect to each other. Such mechanical sensors are well known in the art and will not be further discussed here.

The flow meter 54 is downstream from the valve 53, and is also coupled in wireless data communication to the computer 55. Both the valve 53 and the flow meter 54 may instead be coupled in data communication to the computer 55 through a wire or cable extending from the valve 53 and flow meter 54 up the auxiliary line 45 and to the computer 55. The flow meter 54 measures the volume and speed of water being delivered through the auxiliary line 45 and regulated by the valve 53. In other embodiments, a pressure sensor is used instead of the flow meter 54, and measures the pressure of the water moving through the auxiliary line 45. The flow meter 54 transmits data to the computer 55, which, in response to processing the data, controls the valve 53. For example, if the span 17 moves over an area of the field 22 which has no water requirement, and the flow meter 54 detects that water is continuing to flow through the auxiliary line 45, the computer 55 will instruct the valve 53 to close. In this way, the flow meter 54 verifies that the selected volume, speed, and pressure of water is being provided to the distribution assembly 15 for that span 17.

The auxiliary line 52 extending from the chemical line 20 is a conduit formed with a shut-off valve 60, and an electronic metering valve 61 to control the flow of chemicals in the distribution assembly 15 through the auxiliary line 52 from the chemical line 20, and to supply chemicals at each span 17 with a selected amount of chemicals. A flow meter 66 downstream from the valves 60 and 61 measures the volume and speed of chemicals moving through the auxiliary line 52. In other embodiments of the sprinkler 10, a pressure sensor is provided in the auxiliary line 52 instead of the flow meter 66, to monitor the pressure of chemical in the auxiliary line 52. The shut-off valve 60 moves between an open position and a closed position to allow or prevent chemicals from flowing down the auxiliary line 52 from the chemical line 20. The metering valve 61 is a needle valve or similar valve for making fine adjustments in flow, and regulates the volume, speed, and pressure of the chemicals being delivered from the chemical line 20 through the auxiliary line 52. The metering valve 61 is generally preset and periodically re-calibrated to communicate a selected volume of chemical. For example, the metering valve 61 in the innermost span 17 is preset to deliver two ounces of chemical, while the metering valve 16 in the outermost span 17 is preset to deliver twelve ounces of chemical. Because the outermost span 17 moves at a faster speed than the innermost span 17, more chemical must be communicated through the auxiliary line 52 in the outermost span 17 than through the auxiliary line 52 in the innermost span 17. The amount of chemical applied under a span 17 can be adjusted by changing the rate at which the sprinkler 10 rotates, with faster rotational speeds applying less chemical and slower rotational speeds applying more chemical. The application of water is then adjusted with the rotational speed of the sprinkler 10 effecting that adjustment, as described herein.

The metering valve 61 and the flow meter 66 are coupled in data communication to the computer 55 at the top 35 of the upstream tower 13, and transmit data to the computer 55, which, in response to receiving the data, processes the data, determines whether an adjustment should be made to the metering valve 61, and returns a control signal to the metering valve 61 to adjust the metering valve 61. For example, if the span 17 moves begins to rotate faster, the computer 55 will instruct the metering valve 61 to open and provide more chemical to the distribution assembly 15 for spraying on that area of the field 22 under that span 17, to ensure that the selected amount of chemical is applied to the ground 16. The flow meter 66 measures the flow of chemical through the auxiliary line 52 to ensure that the proper amount of chemical is moving through the auxiliary line 52. The flow meter 66 is also useful for calibrating the metering valve 61.

The distribution assembly 15 includes the auxiliary lines 45 and 52 and a nozzle manifold 81 coupled in fluid communication to the auxiliary lines 45 and 52 to receive water and chemicals, respectively, from the water line 11 and chemical line 20. The auxiliary lines are coupled in fluid communication to a Y coupler 62, which has a first inlet 63, a second inlet 64, and an outlet 65 downstream from the first and second inlets 63 and 64. The Y coupler 62 defines an injection port for injecting chemicals into the water supplied from the water line 11. The auxiliary line 45 is connected to the first inlet 63, the auxiliary line 52 is connected to the second inlet 64, and the outlet 65 connects to a pipe 70 coupled to a mixing chamber 71.

Figure 5:
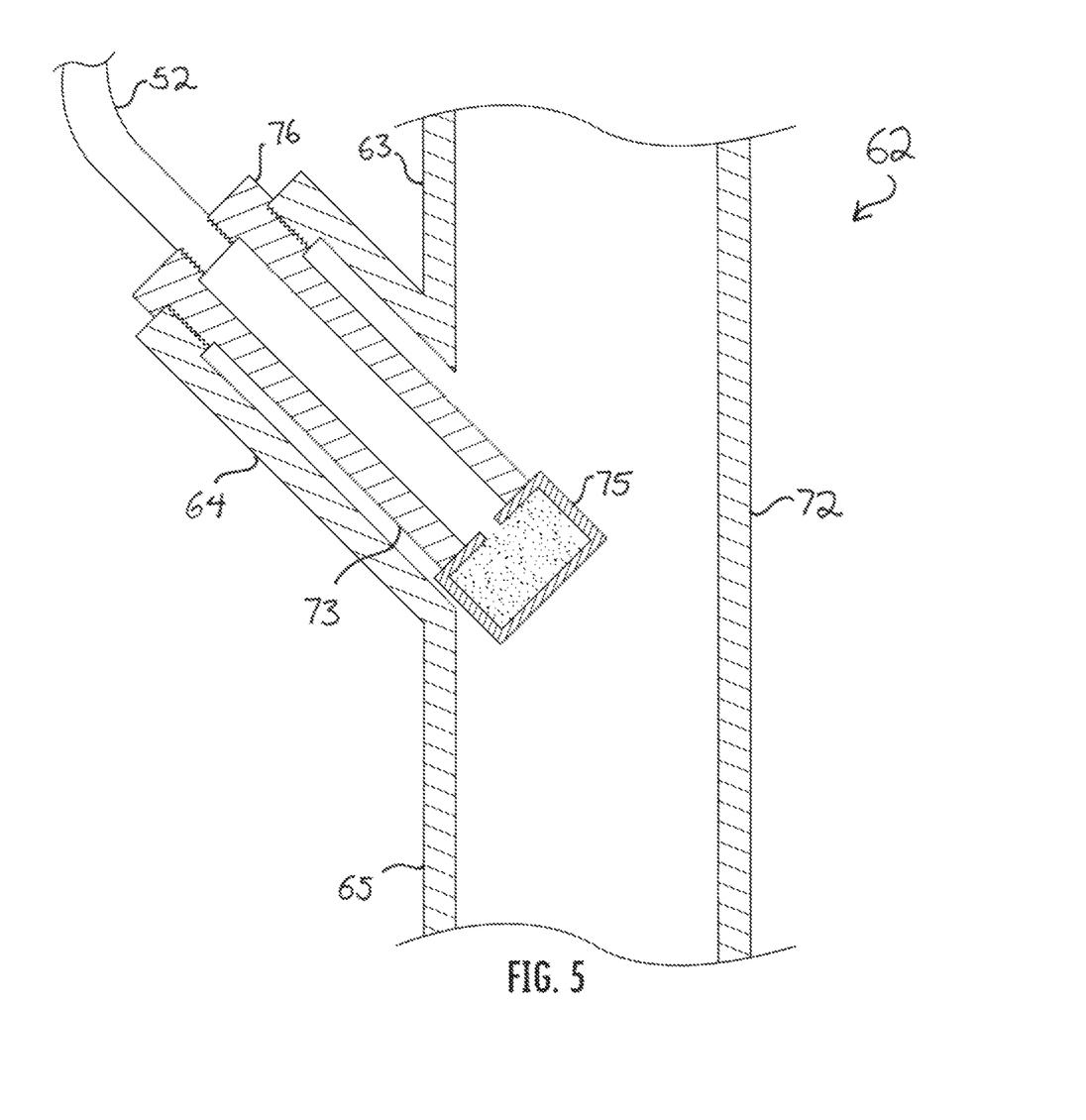
FIG. 5 is a section view of an injection port in the span of the multiple-line irrigation system of FIG. 1, taken along the line 5-5 in FIG. 4.

With reference to FIG. 5, which shows a section view of the Y coupler 62, the Y coupler 62 has a body 72, and the second inlet 64 is an extension of the body 72 that holds and contains an injection check valve 73 in an interior 74 of the second inlet 64. The injection check valve 73 is threadably engaged to the second inlet 64, and extends into the Y coupler 62 toward the outlet 65. The injection check valve 73 is of the type marketed under the trademark Mister Mist'r® and disclosed in U.S. Pat. No. 6,230,982, or similar check valves that are useful for preventing backflow of a chemical or other liquid, such as a ball float valve. The injection check valve 73 has a tip 75 directed into the flow of water from the first inlet 63 to the outlet 65, and has a threaded base 76 to which the auxiliary line 53 is threadably engaged, as shown in FIG. 5, so that chemicals communicated through the auxiliary line 52 are applied to the flow of water in the Y coupler 62. The tip 75 holds an porous elastomeric insert through which chemicals are applied at a pressure at which the chemicals are caused to disperse as tiny droplets through the tip 75, which droplets are then introduced into the flow of water in the Y coupler 62 for mixing. The check valve 73 moves between open and closed conditions. The check valve 73 moves into the open condition to communicate the chemicals in the check valve 73 from the auxiliary line 52 into the Y coupler 62 in response to the pressure at which the chemicals are supplied being greater than the pressure of the water in the Y coupler 62. When the pressure at which the chemicals are supplied is greater than the pressure of the flow of water in the Y coupler 62, the water cannot enter the injection check valve 73 or cause contaminating back flow. The check valve 73 moves into the closed condition to prevent communication of the chemicals into the water in the coupler 62, and to prevent the movement of water into the auxiliary line 52, in response to the pressure at which the chemicals are supplied being equal to or less than the pressure of the water in the Y coupler 62.

Water from the first inlet 63 enters the outlet 65 together with chemicals from the second inlet 64; this combination of water and chemicals will be referred to as a "water-chemical mixture." This term does not refer to a particular ratio of water to chemicals. Instead, the water-chemical mixture is of a variable concentration set independently at each span 17. For example, the water-chemical mixture may include a ratio of 200 parts water for each part chemical in one span 17, and in another span 17, the water-chemical mixture may include a ratio of 2,000 parts water for each part chemical.

Returning to FIG. 4, the mixing chamber 71 is coupled in fluid communication to the outlet 65 of the Y coupler 62. In a preferred embodiment, the mixing chamber 71 includes a housing and a paddle wheel mounted for rotation inside the housing to spin and disrupt the flow of the water-chemical mixture from the Y coupler 62 to the distribution assembly 15, thereby thoroughly mixing the water and the chemicals in the water-chemical mixture. In other embodiments, the mixing chamber 71 is a housing with internal baffles that directs the water-chemical mixture through a circuitous route inside the housing, thereby mixing the water and chemicals in the mixing chamber between Y coupler 62 and the distribution assembly 15. The water-chemical mixture is communicated from the mixing chamber 71 into the distribution assembly 15 by the force of gravity and by the flow of water in the auxiliary line 45 and chemicals in the auxiliary line 52.

With reference still to FIG. 4, the distribution assembly 15 includes the nozzle manifold 81, which has a top 82, an opposed bottom 83, and opposed ends 84 and 85 which are closed by caps 90 and 91. The nozzle manifold 81 is a long, cylindrical pipe that extends substantially across the span 17 and depends from and is supported from the water line 11 by wires 92 which are spaced apart along the nozzle manifold 81. Springs 86 tie the ends 84 and 85 to the towers 13 to prevent the nozzle manifold 81 from swaying during movement of the sprinkler 10. An inlet 93 is formed in the top 82 of the nozzle manifold 81 and is coupled in fluid communication to the mixing chamber 71 to receive the water-chemical mixture from the mixing chamber 71. The water-chemical mixture is communicated through the nozzle manifold 81 from the inlet 93 to the opposed ends 84 and 85. A plurality of heads 94 are formed in the bottom 83 of the nozzle manifold 81. Typically, in a span 17 which is 180 feet in length, the distribution assembly has thirty-six heads 94 formed in the bottom 83 of the nozzle manifold 81. The heads 94 are nozzles preferably directed downward away from the nozzle manifold 81 and sized to disperse a selected volumetric flow directly to the crops on the field 22, but, in other embodiments, the heads 94 are threaded couplings on which nozzles are threadably engaged, the farmer choosing nozzles according to the needs of the field 22. Generally, nozzles on spans 17 which are closer to the central pivot 14 will be smaller and have lower maximum flow rates than the nozzles on spans 17 which are further from the central pivot 14; because the spans 17 proximate to the central pivot 14 rotate more slowly than spans 17 far from the central pivot 14, the nozzles on those spans 17 generally require lower maximum flow rates. The size of the nozzles and the corresponding maximum flow rates for the nozzles are programmed into the computer 55 for each span 17 so that the maximum flow rates are known and can be adjusted for.

The caps 90 and 91 are cylindrical caps which fit over the otherwise open ends 84 and 85, respectively, of the nozzle manifold 81. The caps 90 and 91 are secured onto the ends 84 and 85, such as by friction fit, welding, or a threaded engagement. When the caps 90 and 91 are secured onto the ends 84 and 85 of the nozzle manifold 81, the caps 90 and 91 close the nozzle manifold 81. The caps 90 and 91 are each formed with a head 95 which, when the caps 90 and 91 are secured onto the ends 84 and 85, are disposed proximate to the top 82 of the nozzle manifold 81 and are directed outward and downward away from the nozzle manifold 81. The distribution assembly 15 operates to distribute the water-chemical mixture to the field 22 below the span 17 as the sprinkler 10 moves across the field 22. Water 45 is supplied from the water line 11 through the filter and air separator assembly 44 to the distribution assembly 15.

Referring still to FIG. 4, the filter and air separator assembly 44 is mounted to the top 43 of the water line 11 and is supported with struts 100 extending from the water line 11. The filter and air separator assembly 44 includes a manifold 101, a filter 102 downstream from the manifold 101, and an air separator 103 downstream from the filter 102. The manifold 101 includes a tank 104 and a plurality of hoses 105 coupled between the tank 104 and the water line 11 to deliver water to the tank 104 from the water line 11. The hoses 105 have threaded ends that are threadably engaged to outlets 110 which are spaced along the top of the water line 11. Where a farmer is modifying an existing irrigation system to form the sprinkler 10, the water line 11 will typically have outlets formed along the water line 11, and the outlets 110 are generally three-quarters of an inch hose couplings spaced at between fifteen and forty-five inches apart, with spacing typically being thirty inches apart. Most existing irrigation systems have these outlets, and as such, it is contemplated that the sprinkler 10 can be built from existing irrigation systems by modifying in this way and as taught throughout this description. In such irrigation systems to be modified into the sprinkler 10, the farmer removes goosenecks or other devices previously coupled to the outlets 110 and threads the hoses 105 to the outlets 110. FIG. 4 shows three hoses 105 coupled in fluid communication to the pipe 11; one having ordinary skill in the art will appreciate that more or less hoses 105 may be coupled as is needed to provide flow through the filter and air separator assembly 44 to the distribution assembly 15, depending on selected flow through the water line 11 and on which span 17 the hoses 105 are on, with the outermost spans 17 typically requiring a greater number of hoses 105 due to higher volume demands. The hoses 105 extend from the water line 11 to the underside of the tank 104 to supply water directly from the water line 11 to the tank 104. The tank 104 is a sealed container and holds water. The tank 104 has a downstream outlet 111, to which the filter 102 is secured. The filter 102 is contained in an in-line housing and is a mesh or screen filter, or other coarse-grain filter to remove rust, minerals, dirt, and other debris from the water supplied by the water line 11, so as to provide a clean supply of water which will not clog the heads 94 and 95 in the distribution assembly 15. In some embodiments, the filter 102 includes an electronic solenoid to automatically release and dump the collected contents of the filter 102 to clean the filter 102.

Figure 6:
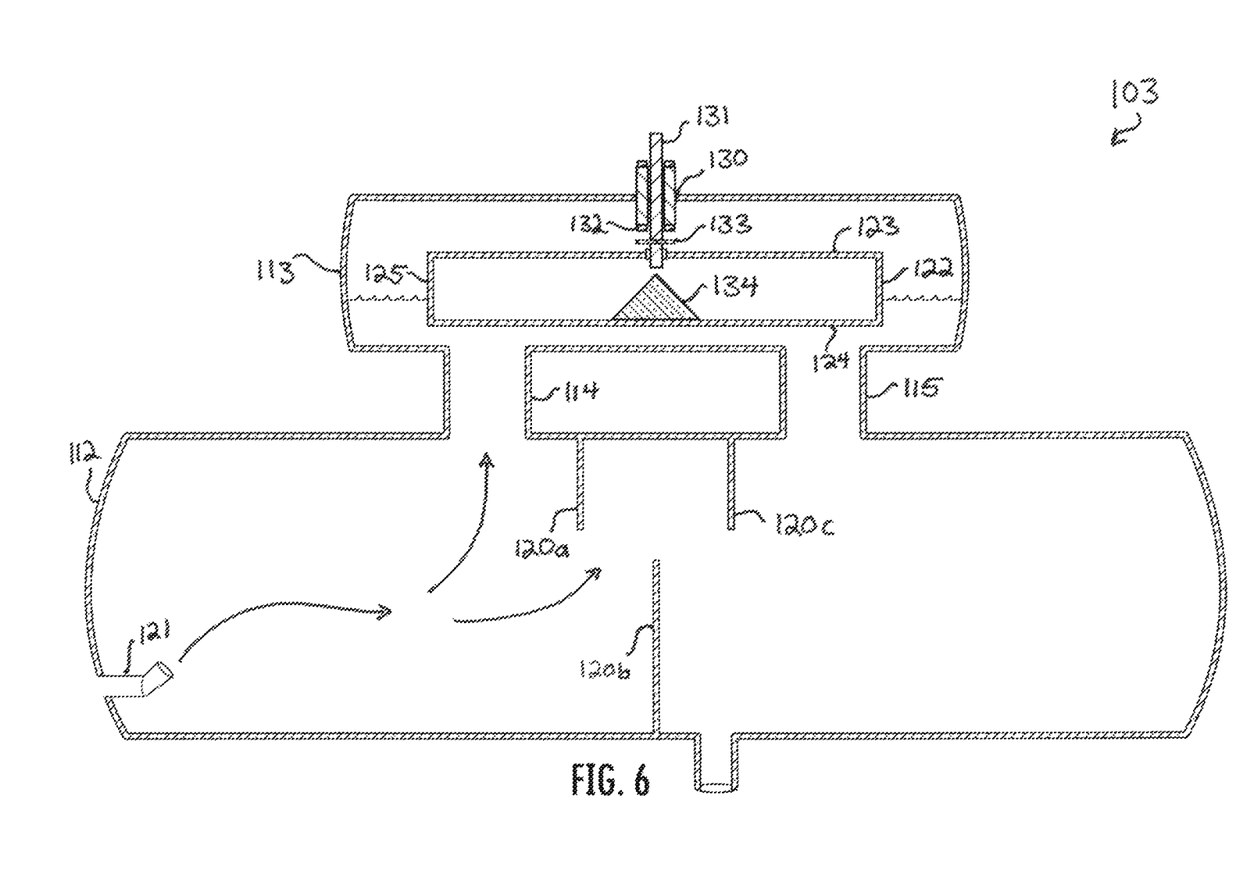
FIG. 6 is a section view of an air separator of the filter and air separator assembly of FIG. 4, taken along the line 6-6 in FIG. 4.

The filter 102 is coupled in fluid communication on the downstream side to the air separator 103. Turning now to FIG. 6, an enlarged section view bisecting the air separator 103 is shown. The air separator 103 includes a lower tank 112 and an upper tank 113, and two stack pipes 114 and 115 between the upper and lower tanks 112 and 113 to communicate water between the upper and lower tanks 112 and 113. The stack pipe 114 is on an upstream end of the air separator 103 and is an upstream stack pipe 114, and the stack pipe 115 is on a downstream end of the air separator 103 and is a downstream stack pipe 115. Internal baffles 120a, 120b, and 120c are mounted within the lower tank 112 to direct the flow of water between the upstream and downstream stack pipes 114 and 115 and cause air to be forced up the upstream stack pipe 114. Water enters the lower tank 112 through an inlet 121 which is coupled in fluid communication to the filter 102 (shown in FIG. 4). The baffle 120a depends within the lower tank 112, so that water encountering the baffle 120a is directed upwards into the upstream stack pipe 114, as seen in the arrowed lines in FIG. 6. Water that flows below the baffle 120a encounters baffle 120b, is directed upward and then downward when the water encounters baffle 120c. The water directed upwards into the upstream stack pipe 114 is less dense and contains air bubbles, while the water flowing under the baffle 120a is more dense and contains little air.

Water passing through the upstream stack pipe 114 enters the upper tank 113. The upper tank 113 includes a floating tub 122 with a top 123, an opposed bottom 124, and a continuous sidewall 125. The upper tank 113 is formed with a circular port 130 through the top of the upper tank 113, and the tank has a cylindrical post 131 which extends from the top 123 of the tub 122 through and encircled by the port 130. The port 130 has a seat 132 which depends downwardly into the upper reservoir 113 toward the tub 122, and the post carries an annular seal 133 disposed above the top 123 of the tub 122 and below the seat 132. The tub 122 is thus carried within the upper reservoir 113 for vertical reciprocal movement between a high position, in which the seal 133 on the post 131 is seated against the seat 133, sealing the port 130 closed, and a low position, in which the seal 133 on the post 131 is away from the seat 132 and the port 130 is opened. The tub 122 moves to the high position when a large amount of water moves through the air separator 103 and a correspondingly small amount of air is within the air separator 103. The tub 122 moves to the low position when a small amount of water is within the air separator 103 and a correspondingly large amount of air is inside the air separator 103, and the port 130 is open to allow air to move out of the air separator 103. Ballast 134 within the tub 122 provides the tub 122 with the proper density so that the tub 122 moves between the high and low positions to allow air in the air separator 103 to escape through the port 130.

In operation, when a large amount of water moves through the upstream stack pipe 114 and into the upper tank 113, the upper tank 113 is filled with water, and the tub 122 floats and moves into the high position, sealing the port 130 and preventing air from leaving the air separator 103. Water thus flows from the upstream stack pipe 114, around and below the tub 122, and down the downstream stack pipe, while air is trapped above the tub 122. When a small amount of water moves through the upstream stack pipe 114 and into the upper tank 113, the upper tank 113 has little water, and the tub 122 sits low in the upper tank 133, unsealing the port 130 and allowing air to escape through the port 130. In this way, water thus flows from the upstream stack pipe 113, around and below the tub 122, and down the downstream stack pipe, while air is vented out the port 130.

A farmer can choose to operate the sprinkler 10 with or without chemicals. Discussion of operation of the sprinkler 10 with chemicals will be described first. Typically, the sprinkler 10 rotates about the field 22 at a constant speed which is programmed into the computer 55. The sprinkler 10 is useful for applying water and chemicals to a circular field and for precisely metering the application of both water and chemicals to distinct arcs and sectors of a circular field independently of other arcs and sectors of the circular field, and is useful for preventing chemical contamination of the water in the water line 11 and in the water supply or fluid source 14.

Figure 2:
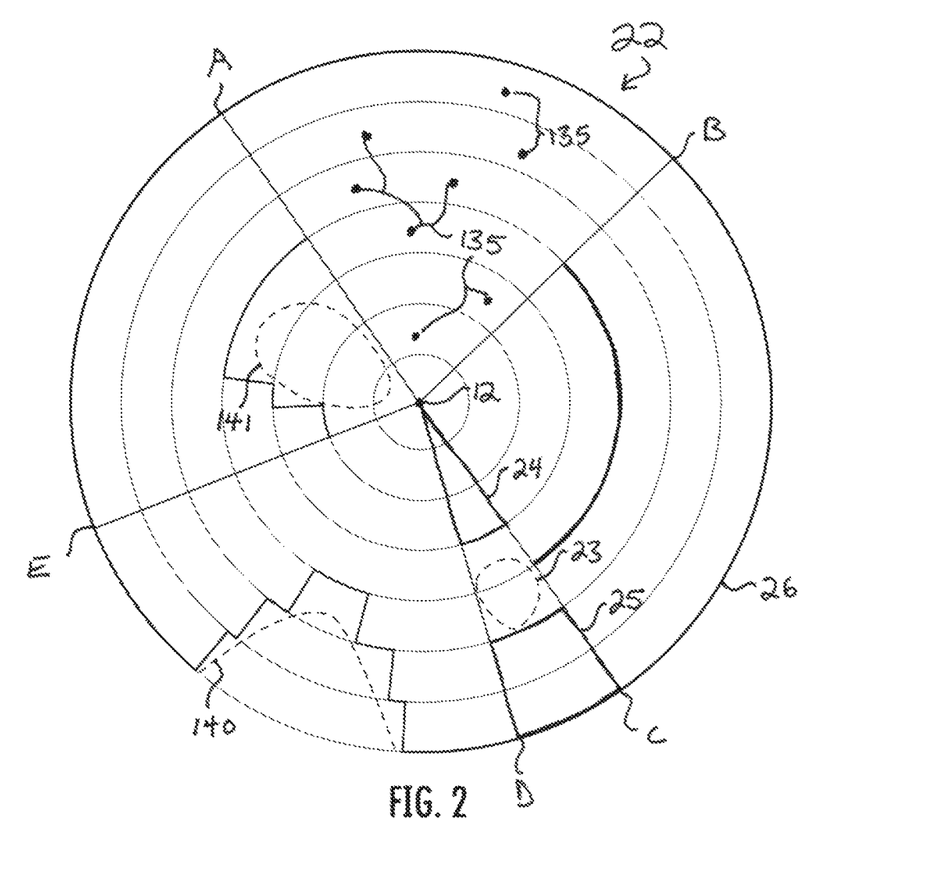
FIG. 2 is a top plan view of a field over which the multiple-line irrigation system of FIG. 1 moves to distribute water and chemicals.

FIG. 2 illustrates the field 22 of a farmer and will now be referred to in conjunction with the structure of the sprinkler 10 shown in FIG. 4. The field 22 is divided into seven concentric rings, with each ring corresponding to a section of the field 22 over which one of the spans 17 of the sprinkler 10 passes as the sprinkler rotates about the central pivot 12. The field 22 has a diversity of soil types, elevations, sun and wind exposures, and as such, the farmer has planted different crops in the field 22 in arcs and sectors. As the terms are used here, an "arc" describes a arcuate portion of the field 12 having co-radial lower and upper arcuate boundaries falling under a single span 17, and a "sector" describes a section of the field including more than one arc. The arcs will be referred to herein based on their distance from the central pivot 12, such that a first arc is an innermost arc, a second arc is the next most innermost arc, and so on. Additionally, the spans 17 which pass over the arcs will be referred to in the same way: the first span 17 passes over the first arc, the second span 17 passed over the second arc, etc. The farmer begins operating the sprinkler 10 with the sprinkler 10 in a first position or position "A", indicated by the line extending outwards from the central pivot 12 and denoted with the reference character A. Various positions of the sprinkler 10 in the field 22 will be referred to herein as position A, position B, etc. corresponding to the lines bearing reference characters A, B, etc., as shown in FIG. 2. As the sprinkler 10 rotates clockwise from position A to position B, the sprinkler 10 moves over a consistent section of the field 22. The elevation is relatively constant, the soil is consistent, and there is only a single crop planted in this section. The watering and chemical requirements are consistent between position A and position B. The topography of the field 22 is programmed into the central computers, and live probes 135 are placed throughout the field 22. The live probes 135, sensors which are well known in the art, are buried at or just below the surface of the ground 16 and are wirelessly coupled to the central computer to communicate information about temperature, moisture, and other environmental data of the soil local to the live probe 135. While live probes 135 are shown only in the section of the field 22 between position A and position B, one having ordinary skill in the art will readily appreciate that live probes are distributed across the entire field 22 as is common.

The crop planted between position A and position B requires both water and chemicals, and so as the sprinkler 10 rotates from position A to position B, the sprinkler 10 disperses water and chemical on the field 22. Water is supplied from the fluid source 14 into the water line 11, communicating down through the entire water line 11 along each span 17. The water moves through the water line 11 from proximate to the central pivot to the downstream end 31 of the first span 17, over the tower 13, to the downstream end 31 of the second span 17, and on until the water reaches the downstream end 31 of the last span 17. The water is supplied from the fluid source 14 through the water line 11 at a constant flow rate and pressure during rotation of the sprinkler 10 from position A to position B.

Chemicals are supplied from the secondary source 21 into the chemical line 20, communicating down through the entire chemical line 20 along each span 17. The chemical flows through the chemical line 20 from proximate to the central pivot to the downstream end 31 of the first span 17, over the tower 13, to the downstream end 31 of the second span 17, and on until the chemical reaches the downstream end 31 of the last span 17. The chemical is supplied from the secondary source 21 through the chemical line 20 at a constant flow rate and pressure during rotation of the sprinkler 10 from position A to position B.

At each span 17, some of the water and chemical is drawn out of the water line 11 and chemical line 20, respectively, through the auxiliary lines 45 and 52 in the distribution assembly 15. Because the water and chemical needs are consistent across the field 22 between position A and position B, the same amount of water and chemical is drawn from the water and chemical lines 11 and 20 throughout movement of the sprinkler 10 from position A to position B. At each span 17, water flows through the water line 11 and down the auxiliary line 45, where the valve 53 is partially open and allows water to continue down the auxiliary line 45, communicated downstream by the force of the water in the water line 11 and by gravity. The flow rate of the water is measured at the flow meter 54 in the auxiliary line 45 and is transmitted to the computer 55 and the central computer, which is pre-programmed with soil, moisture, topographical, and other information about the field under each span 17 between positions A and B, and which also receives live data about the soil from the live probes 135. Based on the soil type, crop type, moisture, topography, live probe 135 information, nozzle size, and rotational speed of each span 17, the computer 55 determines a calculated flow rate through the auxiliary line 45 that is needed for the crop to fully yield, and compares the measured flow rate at the flow meter 54. If the determined flow rate differs from measured flow rate, the computer 55 transmits a signal to adjust the valve 53. The flow meter 54 takes another reading, the computer 55 compares the reading to the calculated flow rate, and another adjustment is made if necessary. This comparison and adjustment process is performed continually throughout movement of the sprinkler 10.

Likewise, at each span 17, chemical flows from the chemical line 20 down through the auxiliary line 52, where the shut-off valve 60 is open and the metering valve 61 is partially open, allowing chemical to continue down the auxiliary line 52, communicated downstream by the force of the chemical in the chemical line 20 and by gravity. Based on the soil type, crop type, moisture, topography, live probe 135 information, nozzle size, and rotational speed of each span 17, the computer 55 calculates whether chemical must be applied to the field under each span 17. Between position A and position B, the computer 55 determines that chemical does need to be applied, and so the computer 55 transmits a signal to the metering valve 61 to open between positions A and B, and chemical is communicated through the auxiliary line 52.

At the Y coupler 62, the water and chemical are mixed to form the water-chemical mixture. Because the Y coupler 62 is downstream from the water line 11 and the chemical line 20, gravity prevents the water-chemical mixture from moving backwards up the auxiliary line 45 and into the water line 11, thus preventing contamination of the water in the water line 11 from chemical, and preventing chemical from being transmitted to other spans 17 of the sprinkler 10. Further, the pressure at which chemical is introduced into the Y coupler 62, relative to the pressure of water in the Y coupler 62, prevents contamination of chemical and auxiliary lines 20 and 52. Because the flow meter 53 and the metering valve 61 have supplied the water and chemical at calculated amounts, the water-chemical mixture has a ratio of water and chemicals that is selected for the field 22 under each span 17 between positions A and B. The water-chemical mixture moves from the Y coupler 62 into the mixing chamber 71 where the water-chemical mixture is thoroughly mixed and is then communicated to the distribution assembly 15. The water-chemical mixture is then sprayed through the heads 94 and 95 for application to the section of the field 22 below each span 17 between positions A and B. In this way, each section of the field 22 is applied with the water-chemical mixture independently of the other section, though between positions A and B the water and chemical needs are consistent.

The sprinkler continues to rotate from position B to position C. However, two crops are planted between position B and position C; a first crop is planted in the innermost four arcs, and a second crop is planted in the outermost three arcs. The first and second crops have the same water requirements but different chemical requirements; the first crop cannot tolerate chemicals while the second crop requires chemicals. Thus, as the sprinkler 10 rotates from position B to position C, the shut-off valves 60 in the innermost four spans 17 shut, while the shut-off and metering valves 60 and 61 in the outermost three spans 17 are open, so that only water is applied to the crops in the innermost four arcs 17, but the water-chemical mixture is applied to the crops in the outermost three arcs. In this way, chemical is spared from consumption, because chemical does not have to be applied where it is not needed.

The sprinkler 10 continues to rotate from position C to position D. As discussed before, this section of the field 22 includes areas 23, 24, and 25, with area 23 being a pond which does not require any water or chemicals, area 24 having one water and chemical requirement, and area 25 having another water and chemical requirement. As the sprinkler 10 rotates from position C to position D, water and chemicals are communicated through the water line 11 and the chemical line 20, respectively. However, in the fourth and fifth spans 17, which pass over the pond area 23, the valve 53 and shut-off valve 60 are shut, so that neither water nor chemical are supplied to the distribution assemblies in these spans 17. In this way, the pond area 23 receives no water and no chemicals. Concurrently, however, the areas 24 and 25 do receive water and chemicals. In the first, second, and third spans 17, the valve 53 is opened, and the shut-off valve 60 is open, to draw a large amount of water from the water line 11 and to draw chemicals from the chemical line 20. The water and chemicals are mixed and then expelled through the heads 94 and 95 onto the field 22 under the first, second, and third spans between positions C and D. In the sixth and seventh spans 17, the valves 53 are partially shut and the shut-off and metering valves 60 and 61 are open, to draw a medium amount of water from the water line 11 and to draw chemicals from the chemical line 20. The water and chemicals are mixed and then expelled through the heads 94 and 95 onto the field 22 under the sixth and seventh spans between positions C and D. In this way, the pond area 23 receives no water and no chemicals, the area 24 receives full water and full chemicals, and the area 25 receives partial water and full chemicals. Both water and chemicals are spared consumption with precise, independent application across the spans 17.

The sprinkler 10 continues to rotate from position D to position E. The area identified with reference character 140 and in broken line represents a hill in the field 22 which has higher watering requirements than the rest of the field 22 between position D and E. The hill area 140 begins in the fifth arc and widens in the sixth and seventh arcs. As the sprinkler 10 moves away from position D, the water-chemical mixture being applied under every span 17 is the same. However, as the sprinkler 10 approaches the hill area 140, the mixture changes. The valves 53 in some of the spans 17 open wider as the sprinkler 10 passes onto the hill area 140 and then close as the sprinkler 10 moves off the hill area 140. More specifically, the valve 53 in the seventh span 17 opens wide first, because the seventh span 17 encounters the hill area 140 first. The valve 53 in the sixth span 17 opens wide next, while the valve 53 in the seventh span 17 continues to be held open wide, as the sixth span 17 is the next span 17 to encounter the hill area 140. The valve 53 in the fifth span 17 opens wide next, while the valves 53 in the sixth and seventh spans 17 continue to be held open wide, as the fifth span 17 is the next to encounter the hill area 140. The sprinkler 10 crests the hill and begins to move down the hill. As the sprinkler 10 rotates, the valve 53 in the fifth span 17 closes partially as the fifth span 17 moves off the hill area 140, then the valve 53 in the sixth span 17 closes partially as the sixth span 17 moves off the hill area 140, and finally the valve 53 in the seventh span 17 closes partially as the seventh span 17 moves off the hill area 140. The sprinkler 10 then continues to rotate to position E. In this way, the hill area 140 has been watered independently from the rest of the field 22 between positions D and E. Both water and chemicals are spared consumption, because the section of the field 22 outside of the hill area 140 did not have to be over-watered in an effort to put an adequate amount of water on the hill area 140.

The sprinkler 10 continues to rotate from position E back to position A. This section of the field 22 includes an area 141 identified in broken line which represents poor soil that will not produce. As such, the farmer has decided not to plant crops and not to water and spray chemicals in the area 141. The valves 53 and shut-off valves 60 in the first and second spans 17 are shut at position E so that no water-chemical mixture is applied to the first and second arcs. The valves 53 and shut-off valves 60 in the rest of the spans 17 are open. As the sprinkler 10 rotates, the third span 17 encounters the area 141, and the valve 53 and shut-off valve 60 in the third span 17 shut along with the valves 53 and the shut-off valves 60 in the first and second spans 17. The valves 53 and metering valves 61 in the rest of the spans 17 are open. As the sprinkler 10 continues to rotate, the fourth span 17 encounters the area 141, and the valve 53 and metering valve 61 in the fourth span shut along with the valves 53 and the shut-off valves 60 in the first, second, and third spans 17. The valves 53 and metering valves 61 in the rest of the spans 17 are open. In this way, the sprinkler 10 has prevented water and chemicals from being applied to the area 141 which cannot produce a crop. Both water and chemicals are spared consumption. At position A, the valves 53 and metering valves 61 are opened, and the cycle is repeated.

The above description discloses operation of the sprinkler 10 to apply water and chemicals to the field 22. The sprinkler 10 can also be operated without chemicals, simply by shutting the shut-off valves 60 across all of the spans 17 or by not pumping chemical from the secondary source 21 or by not coupling the chemical line 20 to the secondary source 20. The sprinkler 210 is still effective at applying water to the field 22 without chemicals so that arcs and sectors can be watered independently. Moreover, in some embodiments, the sprinkler 10 distributes water and two chemicals. Two chemicals may desired, for instance, if the farmer wishes to spread both herbicide and fertilizer, but the particular arrangement of the field 22 and the crops in the field 22 prevents the herbicide and fertilizer from being spread together in the same amounts. In such embodiments, the sprinkler 10 carries the water line 11 for communicating water, the chemical line 20 for communicating the first chemical, and a second chemical line for communicating a second chemical. In those embodiments, the Y coupler 62 has an additional inlet which receives the second chemical. In this way, the water, first chemical, and second chemical are kept separate from each other until the distribution assembly 15.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

The invention claimed is:

1. An irrigation system comprising:
   a plurality of spans extending from a central pivot and mounted to be driven across a field about the central pivot;
   a first pipeline extending from the central pivot and supported at an elevated position above the field by moveable towers;
   a second pipeline extending from the central pivot and supported at an elevated position above the field by the moveable towers; and
   each span includes a distribution assembly coupled in fluid communication to the first and second pipelines and adapted to distribute fluids from the first and second pipelines onto the field below the span;
   wherein the fluids distributed onto the field below each span are distributed in a mixture independent of fluids distributed in other mixtures onto the field below other spans.

2. The irrigation system of claim 1, wherein the first and second pipelines are separated from fluid communication with each other along the irrigation system.

3. The irrigation system of claim 1, further comprising an air separator in each span coupled in fluid communication between the first pipeline and the distribution assembly.

4. The irrigation system of claim 1, wherein the distribution assembly in each span includes:
   a manifold having a plurality of nozzles directed toward the field; and
   first and second auxiliary lines extending from the first and second pipelines, respectively, to a coupler which is coupled in fluid communication to the manifold.

5. The irrigation system of claim 4, wherein the first and second auxiliary lines each include an adjustable valve.

6. The irrigation system of claim 4, further comprising a mixing chamber coupled in fluid communication between the coupler and the manifold.

7. An irrigation system for irrigating a field, the system comprising:
   a first pipeline supported across a plurality of spans by moveable towers and connectable to a first fluid source for supplying a first fluid;
   a second pipeline coextensive to the first pipeline, the second pipeline supported across the plurality of spans by the moveable towers and connectable to a second fluid source for supplying a second fluid;
   the first and second pipelines are separated from fluid communication with each other; and
   each span includes a manifold coupled in fluid communication within the span to the first and second pipelines to receive and distribute the first and second fluids onto the field.

8. The irrigation system of claim 7, wherein a plurality of nozzles are formed along the manifold and are directed downwards toward the field.

9. The irrigation system of claim 7, further comprising:
   an auxiliary line formed directly between the first pipeline and the manifold; and
   a valve is formed in the auxiliary line.

10. The irrigation system of claim 7, further comprising:
    an auxiliary line formed directly between the first pipeline and the manifold; and
    a flow meter is formed in the auxiliary line.

11. The irrigation system of claim 7, in which each span further comprises:
    first and second auxiliary lines coupling the first and second pipelines, respectively, with the manifold;
    the first auxiliary line includes a flow meter and a valve; and
    the second auxiliary line includes a shut-off valve meter and an adjustable valve.

12. The irrigation system of claim 11, further comprising a coupler formed between the first and second auxiliary lines and the manifold.

13. The irrigation system of claim 12, wherein:
    the coupler includes a check valve controlling communication of the second fluid into the coupler;
    the check valve opens in response a pressure of the second fluid in the check valve being higher than a pressure of the first fluid in the coupler; and
    the check valve closes in response to the pressure of the second fluid in the check valve being equal to or lower than the pressure of the first fluid in the coupler.

14. The irrigation system of claim 12, further comprising a mixing chamber coupled in fluid communication between the coupler and the manifold.

\* \* \* \* \*